2 Sheets—Sheet 1.

C. F. GODDARD.
Plow.

No. 232,345. Patented Sept. 21, 1880.

Witnesses:
George T. Frezee
Eugene C. Dennis

Inventor:
Charles F. Goddard

2 Sheets—Sheet 2.

C. F. GODDARD.
Plow.

No. 232,345. Patented Sept. 21, 1880.

Witnesses:
George T. Frazee
Eugene C. Dennis

Inventor:
Charles F. Goddard.

UNITED STATES PATENT OFFICE.

CHARLES F. GODDARD, OF WEST MITCHELL, IOWA.

PLOW.

SPECIFICATION forming part of Letters Patent No. 232,345, dated September 21, 1880.

Application filed March 18, 1879.

*To all whom it may concern:*

Be it known that I, CHARLES F. GODDARD, of West Mitchell, in the county of Mitchell and State of Iowa, have invented a new and useful Improvement in Plows, of which the following is a specification.

My invention relates to wheel-plows; and it consists, essentially, in providing a common plow with two supporting-wheels, one of which is attached to the beam of the plow and runs in the furrow ahead of the plow, the other one being attached to the rear end of the plow and running in the furrow behind the plow, in the respective positions shown, whereby the line of support joining the points of contact of the two wheels with the ground crosses the middle of the plow proper, and thus a firm and steady support is given to the plow both vertically and laterally, the friction of the plow on the bottom and wall of the furrow is greatly diminished, the use of a wheel on the rough unplowed ground is avoided, and both the width and depth of the furrow accurately gaged, all of which is accomplished without using a tongue, axle, or handles.

Figure 1:
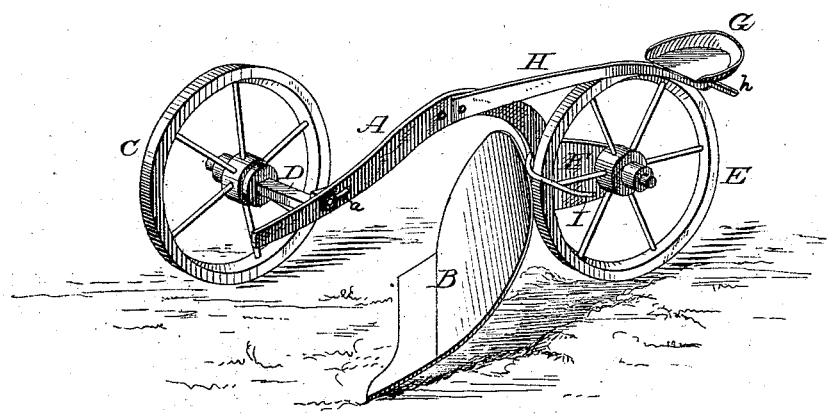
Figure 2:
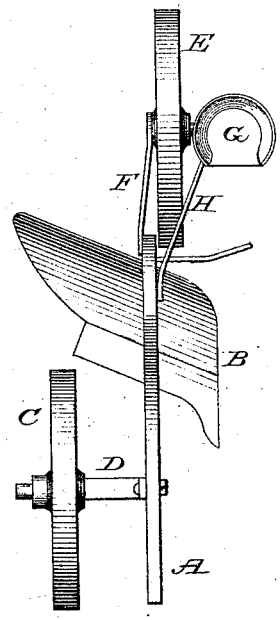
Figure 3:
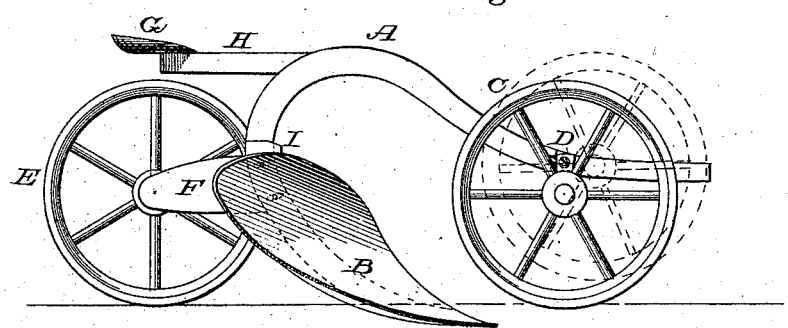
Figure 4:
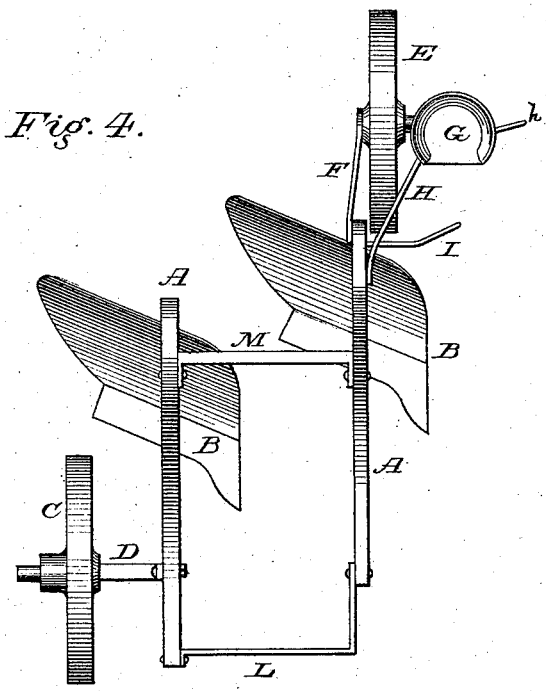

In the accompanying drawings, in which similar letters of reference indicate like parts, Figure 1 is a perspective of a plow to which my invention has been applied. Fig. 2 is a plan view, and Fig. 3 a side elevation, of the same, while Fig. 4 shows my plan of coupling together two of these plows.

A is the beam of the plow. B is the mold-board with the share attached. C is one of the supporting-wheels which revolves on the angular spindle D, which is fastened to the beam A with a single bolt. Around this bolt, when slightly loosened, the spindle D may be revolved, thereby raising or lowering the wheel C and regulating the depth of the furrow. The other supporting-wheel, E, revolves on a spindle which is fixed to the arm F. The arm F is bolted to the beam of the plow through slotted holes, whereby the height of the wheel E may be varied, thus giving a greater or lesser inclination to the mold-board B, as may be required by the varying conditions of the soil.

G is the driver's seat, which is attached to the beam by its supporting-arm H. This arm terminates in a handle, *h*, seen at the left of the seat, which is used to turn the plow out of the ground or to steady it while turning, &c. By having several bolt-holes in the beam of this arm H it may be moved back or forward along the beam to assist in balancing the plow when the driver rides, or the plow may be provided with handles, as in the common plow, instead of the seat G and arm H.

The hole through the beam by which the spindle D is bolted to the beam is slotted lengthwise of the beam, to allow spindle D to be moved back and forth to bring the middle of the plow proper directly or nearly over the line joining the points of contact of the two wheels with the ground. I is the driver's foot-rest.

The end of the beam is provided with the usual clevis to permit lateral and vertical variation of the hitch, and any style of colter may be used.

Fig. 4 shows my method of attaching together two of these plows. L is a brace, which connects the forward ends of the plow-beams, and M is a brace connecting the rear ends of the same. The wheel C is attached or connected to the forward or right-hand plow, and the wheel E and seat G to the left or hindmost one, as shown and described.

Placing the principal supporting-wheels of a plow in the furrow is not new, and I do not claim it. Nor do I claim a plow without a landside as new.

What I claim as new is—

The curved plow-beam A, provided with the slot *a*, in combination with the slotted rear arm, F, adjustable spindle D, front wheel, C, and rear wheel, E, arranged so that the line of support between the wheels may pass the middle of the plow, whereby it is supported from downward and lateral pressure without the aid of a landside, tongue, or third wheel, substantially as shown and described.

CHARLES F. GODDARD.

Witnesses:
GEORGE T. FRAZEE,
EUGENE C. DENNIS.